US012738795B2

(12) United States Patent
Onishi et al.

(10) Patent No.: US 12,738,795 B2
(45) Date of Patent: Sep. 15, 2026

(54) ROTARY ELECTRIC MACHINE

(71) Applicant: Mitsubishi Electric Corporation, Tokyo (JP)

(72) Inventors: Yoshihiko Onishi, Tokyo (JP); Isao Sonoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 210 days.

(21) Appl. No.: 18/694,027

(22) PCT Filed: Nov. 5, 2021

(86) PCT No.: PCT/JP2021/040696
§ 371 (c)(1),
(2) Date: Mar. 21, 2024

(87) PCT Pub. No.: WO2023/079670
PCT Pub. Date: May 11, 2023

(65) Prior Publication Data
US 2024/0396400 A1 Nov. 28, 2024

(51) Int. Cl.
*H02K 5/10* (2006.01)
*H02K 9/22* (2006.01)
*H02K 11/33* (2016.01)

(52) U.S. Cl.
CPC ............... *H02K 5/10* (2013.01); *H02K 9/227* (2021.01); *H02K 11/33* (2016.01)

(58) Field of Classification Search
CPC .......... H02K 5/10; H02K 9/227; H02K 11/33; H02K 5/06; H02K 2213/03; H02K 5/15; H02K 11/0141; H02K 11/40
See application file for complete search history.

(56) References Cited

U.S. PATENT DOCUMENTS 5,484,013 A 1/1996 Morikawa et al.
2011/0122530 A1* 5/2011 Sekii ........................ H02K 3/50 310/71

(Continued)

FOREIGN PATENT DOCUMENTS

JP 50-093503 U 8/1975
JP 59-092565 U 6/1984

(Continued)

OTHER PUBLICATIONS

International Search Report for PCT/JP2021/040696 dated Jan. 18, 2022.

(Continued)

*Primary Examiner* — Christopher M Koehler
*Assistant Examiner* — Riley Owen Stout
(74) *Attorney, Agent, or Firm* — Sughrue Mion, PLLC

(57) ABSTRACT

A rotary electric machine includes a control board, a motor which is driven by the control board, a motor frame which accommodates the motor, a cover which covers the control board together with the motor frame, and a heat sink which is fixed to the motor frame. The motor frame, the cover, and the heat sink are made of metal, at least three claw portions are provided on the motor frame or the heat sink, at least three press-fitting surfaces are provided on an inner surface of the cover, each of which the three claw portions are each press-fitted to and come into contact with, the three claw portions are disposed to have the same radius centered on an output shaft of the motor, and an angle between two claw portions adjacent to each other in a circumferential direction is smaller than 180 degrees.

6 Claims, 5 Drawing Sheets

(56) References Cited

U.S. PATENT DOCUMENTS

| | | | | |
|---|---|---|---|---|
| 2012/0161590 | A1* | 6/2012 | Yamasaki | H02K 11/33 310/68 B |
| 2016/0218597 | A1 | 7/2016 | Hayashi | |
| 2017/0085138 | A1 | 3/2017 | Nakano et al. | |
| 2017/0302131 | A1 | 10/2017 | Kuroda | |
| 2018/0219449 | A1 | 8/2018 | Yamamoto | |
| 2020/0146148 | A1 | 5/2020 | Higashide et al. | |
| 2020/0156696 | A1* | 5/2020 | Hara | B62D 5/0409 |
| 2020/0313494 | A1* | 10/2020 | Hattori | H02K 5/10 |
| 2020/0386636 | A1 | 12/2020 | Shigeta | |
| 2021/0408866 | A1 | 12/2021 | Ushio | |

FOREIGN PATENT DOCUMENTS

| | | | |
|---|---|---|---|
| JP | 06-339244 | A | 12/1994 |
| JP | 2008-188594 | A | 8/2008 |
| JP | 2015-098837 | A | 5/2015 |
| JP | 2016-136829 | A | 7/2016 |
| JP | 2016-140147 | A | 8/2016 |
| JP | 2017-192269 | A | 10/2017 |
| JP | 2018-71499 | A | 5/2018 |
| JP | 2018-125940 | A | 8/2018 |
| JP | 2020-078125 | A | 5/2020 |
| JP | 2020-167761 | A | 10/2020 |
| WO | 2015/186455 | A1 | 12/2015 |
| WO | 2019/059230 | A1 | 3/2019 |
| WO | 2020/110261 | A1 | 6/2020 |

OTHER PUBLICATIONS

Extended European Search Report issued Jan. 20, 2025 in Application No. 21963266.8.

Notice of Reason for Refusal dated Feb. 12, 2025 in Japanese Application No. 2023-557531.

Communication dated Jul. 15, 2025 in Japanese Application No. 2023-557531.

Office Action issued Sep. 3, 2024 in Japanese Application No. 2023-557531.

* cited by examiner

ROTARY ELECTRIC MACHINE

CROSS REFERENCE TO RELATED APPLICATIONS

This application is a National Stage of International Application No. PCT/JP2021/040696 filed Nov. 5, 2021.

TECHNICAL FIELD

The present disclosure relates to a rotary electric machine.

BACKGROUND ART

In a rotary electric machine that is typified by a conventional motor, in particular, a rotary electric machine in which a control device, which includes a cover, a connector, and a control board on which control circuit components and power circuit components are mounted, is disposed on a side opposite to an output shaft of a motor, it is necessary to set a shield in order to prevent electromagnetic noise that is generated from electronic components mounted on the control board from being emitted to the outside or from entering the inside. Specifically, it is necessary to install a metal cover to cover the control board and bring the cover into electrical contact with a motor frame (refer to, for example, Patent Documents 1 and 2).

As the influence of electromagnetic noise that is described in the present case, the amount of external emission is specified as noise that affects equipment (for example, a radio or the like) surrounding the rotary electric machine and degrades its performance, and the external emission is evaluated as electromagnetic interference (EMI). Internal penetration provides a specified amount of electromagnetic noise, confirms the ability of a product to operate without deterioration of performance, and is evaluated as electromagnetic susceptibility (EMS). Here, the electromagnetic interference (EMI) and the electromagnetic susceptibility (EMS) are combined and defined as electromagnetic compatibility (EMC). Hereinafter, the electromagnetic compatibility (EMC) will be referred to as EMC performance.

CITATION LIST

Patent Documents

[Patent Document 1]:
Japanese Unexamined Patent Application, First Publication No. 2020-167761

[Patent Document 2]
Japanese Unexamined Patent Application, First Publication No. 2020-78125

SUMMARY OF INVENTION

Problem to be Solved by the Invention

In recent years, in a rotary electric machine in which a control device, which includes a cover, a connector, and a control board on which control circuit components and power circuit components are mounted, is disposed on the side opposite to an output shaft of a motor, with regard to electromagnetic noise that is generated from electronic components mounted on the control board, for example, a CPU, a driver IC, a switching element, and the like, a requirement for the EMC performance has become stricter. In order to meet this requirement, structures in which a metal cover is installed to cover the control board have been described (refer to, for example, Patent Documents 1 and 2). In order to improve the EMC performance and stabilize the control board, it is necessary to cover the control board with a cover and a motor frame and to strengthen the electrical contact between the cover and the motor frame.

In a rotary electric machine described in a device in the related art, as for a control device that is disposed on the side opposite to an output shaft with respect to an approximately cylindrical motor, a control board often adopts a polygonal shape based on a rectangle for the purpose of improving a material yield and a mounting rate of electronic components. A connector is disposed at an end portion of the control board, giving priority to the degree of freedom of an extraction direction. An L-shaped motor frame is adopted because a power line can be smoothly routed by disposing power circuit components on the back surface of the output shaft of the motor.

Normally, the motor is assembled based on the output shaft of the motor frame. However, in the case of an L-shaped motor frame, since the assembly standard of the control device is different from that of the motor, there is a problem in that position shift is likely to occur when assembling the cover, the electrical contact between the cover and the motor frame tends to become unstable, and the EMC performance becomes unstable.

In the structure of the related art disclosed in Patent Document 1, a mounting portion having an engagement hole is provided on the side surface of a metal cover, and is fixed by being engaged with an engagement protrusion on the motor frame side. In the case of Patent Document 1, in a state where the engagement hole of the cover and the engagement protrusion of the motor frame are aligned with each other, the cover side is deformed and engaged by using a jig from the side surface. However, it is necessary to perform the same process at engaging portions on side surfaces having different directions, so that there is a problem in that assembly man-hours increase. Further, since the cover is deformed and engaged, there is a possibility that the surface treatment on the cover surface may be peeled off. In this case, in usage environment where corrosion resistance is required, corrosion of the cover may progress from a location where the surface treatment on the cover surface has been peeled off, corrosion resistance may decrease, and the holding power of the cover is lowered. In order to prevent this, it is necessary to pot the engaging portion with a sealant, as necessary.

In the structure of the related art disclosed in Patent Document 2, it is described that a plurality of wall portions are provided on a motor frame side to position a cover. Since the cover and the motor frame are press-fitted and fixed to each other at the wall portions in one direction (an X direction) disposed symmetrically, a gap is created in the other direction (a Y direction). In this case, when assembling the cover and the motor frame, the cover is positioned in one direction (the X direction) without a position shift. However, a position shift of the cover may occur in response to an external force in a direction other than the one direction (the X direction), and the contact area of the wall portion may also be reduced. In a case where a similar symmetrical wall portion is added in the other direction (the Y direction), and in a case where there is variation in tightening allowance in the X and Y directions, there is a possibility that a position shift of the cover may occur.

The present disclosure has been made to solve such problems, and has an object to provide a rotary electric machine in which it is possible to stabilize electrical contact between a cover and a motor frame or a heat sink and improve EMC performance.

Means to Solve the Problem

A rotary electric machine according to the present disclosure includes a control board on which a power circuit having a switching element is mounted, a motor which is driven by the control board, a motor frame which accommodates the motor, a cover which covers the control board together with the motor frame, and a heat sink which is fixed to the motor frame. The motor frame, the cover, and the heat sink are made of metal. At least three claw portions are provided on the motor frame or the heat sink. At least three press-fitting surfaces, each of which the three claw portions are each press-fitted to and come into contact with, are provided on an inner surface of the cover. The three claw portions are disposed to have the same radius centered on an output shaft of the motor, and the angle between two claw portions adjacent to each other in a circumferential direction is smaller than 180 degrees.

Effects of the Invention

In the present disclosure, each of the metal claw portions of the motor frame or the heat sink is in contact with each of the press-fitting surfaces of the metal cover, and the angle between two claw portions adjacent to each other in the circumferential direction is smaller than 180 degrees. In this way, the cover holds the motor frame or the heat sink in a well-balanced manner, so that the contact pressure between the cover and the motor frame is stabilized. Therefore, the motor frame or the heat sink and the cover have electrical contact points, and it becomes possible to improve the EMC performance and stabilize the EMC performance.

DESCRIPTION OF EMBODIMENTS

Embodiment 1

Figure 1:
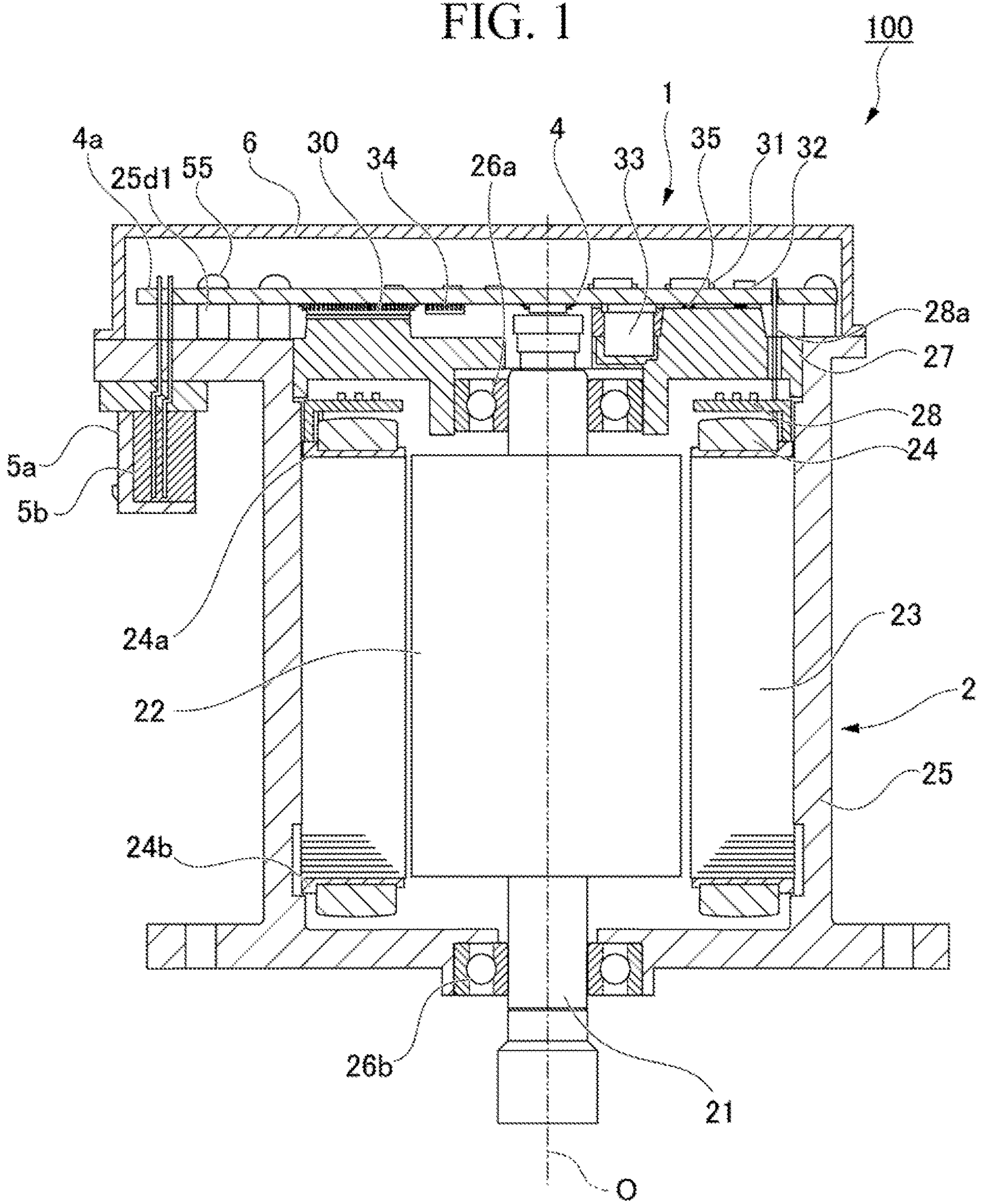
FIG. 1 is a sectional view of a main part of an electric motor according to Embodiment 1.

Hereinafter, Embodiment 1 of the present disclosure will be described using FIGS. 1 to 5. In each drawing, identical or similar components are denoted by the same reference numerals.

FIG. 1 shows a rotary electric machine in Embodiment 1. As the rotary electric machine, an inner rotor type power generation electric machine, an electric motor, or the like can be considered. However, in Embodiment 1, an electric motor will be described as an example.

Hereinafter, Embodiment 1 will be described with reference to the drawings. FIG. 1 is a sectional view of an electric motor 100. The electric motor 100 includes a control unit 1 having a control board 4, and a motor 2 that is driven by the control board 4. The motor 2 has a multiphase winding. The motor 2 includes a rotary shaft (an output shaft) 21, a rotor 22, and a stator 23 in the interior thereof. The rotor 22 has a plurality of pairs of permanent magnets disposed around it. A multiphase winding 24 is disposed on the stator 23. The multiphase winding 24 is wound around bobbins 24*a* and 24*b*.

In FIG. 1, an annular terminal portion 28 is disposed in the vicinity of an upper portion of an end portion of the winding 24. The terminal portion 28 is connected to the end portion of the winding 24 and extends toward the control unit 1. Further, a bearing 26*a* for rotating the rotary shaft 21 is disposed on the upper end side (the control unit 1 side) of the rotary shaft 21. A bearing 26*b* for rotating the rotary shaft 21 is disposed on the lower end side of the rotary shaft 21.

Further, the bearing 26*a* in FIG. 1 is disposed at the center of a heat sink 27. The heat sink 27 is press-fitted and fixed to a motor frame 25. The heat sink 27 is disposed between the motor 2 and the control unit 1 and also serves as a lid for the contents of the motor 2. The motor frame 25 that accommodates the motor 2 has a structure having these parts built into the interior. Although the heat sink 27 is press-fitted and fixed to the motor frame 25, it does not need to be necessarily press-fitted and fixed. The heat sink 27 is press-fitted and fixed to the motor frame 25, so that the heat of the heat sink 27 is easily transmitted to the motor frame 25. Therefore, heat dissipation is further improved.

Figure 2:
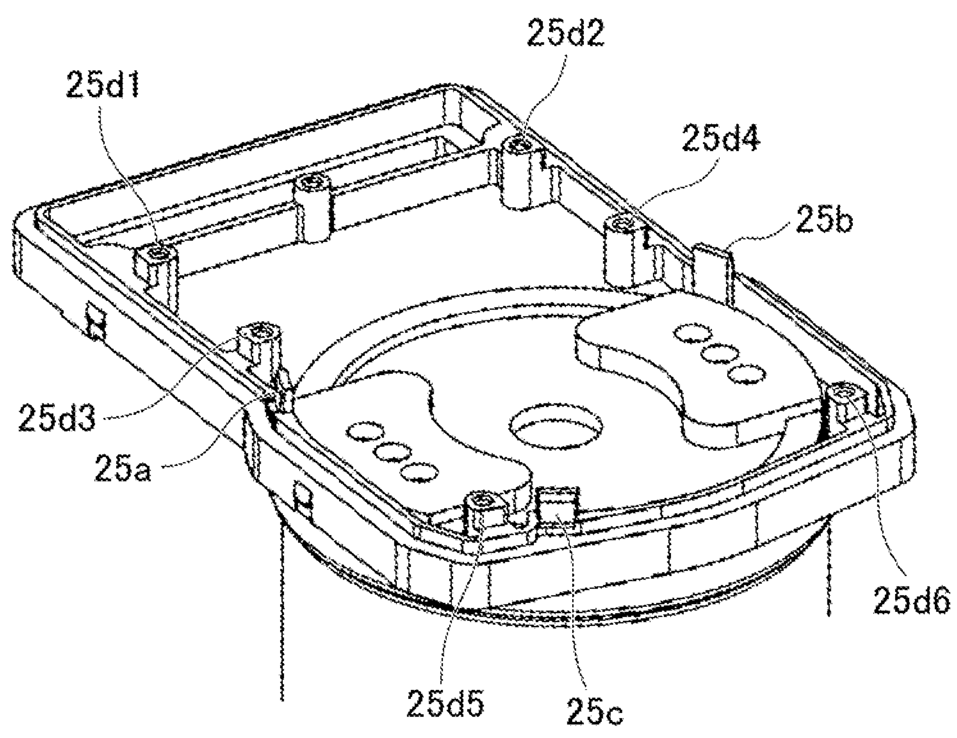
FIG. 2 is a perspective view showing a claw portion of a motor frame of the electric motor in FIG. 1.

The control unit 1 is disposed on the side opposite to the rotary shaft 21 of the motor 2. The control unit 1 includes the control board 4 on which a control circuit and a power circuit built into a cover 6 are mounted, and connectors 5*a* and 5*b* disposed at an end portion 4*a* of the control board 4. A large number of electronic components are mounted on the control board 4, and in particular, a CPU 30 and a driver IC 34 are mounted on the control circuit, and a switching element 31, a shunt resistor 32, a capacitor 33, a choke coil (not shown), and the like are mounted on the power circuit. The control board 4 is fixed to board contact surfaces 25*d*1 to 25*d*6 of the motor frame 25 with screws 55, as shown in FIG. 2. Power and information input from the connectors 5*a* and 5*b* pass through terminals, and the connectors 5*a* and 5*b* are connected to the upper side of the control board 4 on which the control circuit and the power circuit are mounted. A motor terminal 28*a* extending from the end portion of the winding 24 of the motor 2 extends toward the control board 4 and is connected to the power circuit on the side of the control board 4. In this way, an electric current is supplied to the winding 24 of the motor 2, so that the rotary shaft 21 rotates. In Embodiment 1, the cover 6 covers the control board 4 together with the motor frame 25. The cover 6 and the motor frame 25 are made of metal, and as a material for the cover 6 and the motor frame 25, for example, an aluminum material such as an aluminum die cast (ADC) is used.

For example, the switching element 31, a heat generating element such as the shunt resistor 32, the capacitor 33, a choke coil (not shown), and other electronic components are mounted on the power circuit of the control board 4. The heat sink 27 for heat radiation is disposed below the power circuit. The heat sink 27 is made of metal, and a material with high thermal conductivity, for example, an aluminum material such as an ADC is used. In order to secure insulation between the heat generating element and the heat sink 27, it is necessary to provide a predetermined gap between the heat generating element and the heat sink 27. A heat radiating material 35 is provided in the gap, and the heat generated in the heat generating element is radiated to the heat sink 27 through the heat radiating material 35.

A large number of electronic components are mounted on the control board 4, and in particular, the CPU 30 and the driver IC 34 are mounted on the control circuit, and the switching element 31 is mounted on the power circuit. Electromagnetic noise is generated from these mounted electronic components. Here, a GND in the control circuit and the motor frame 25 are connected to each other through the screws 55 that fix the control board 4, the cover 6 and the motor frame 25 have electrical contact points, and the motor frame 25 is fixed to a connection target member (not shown), whereby the connection target member and the GND are made to have the same potential. In this way, the generation of the electromagnetic noise is suppressed, and the requirement for the EMC performance is satisfied.

Here, a configuration in which the cover 6 and the motor frame 25 have electrical contact points will be described.

Figure 3A:
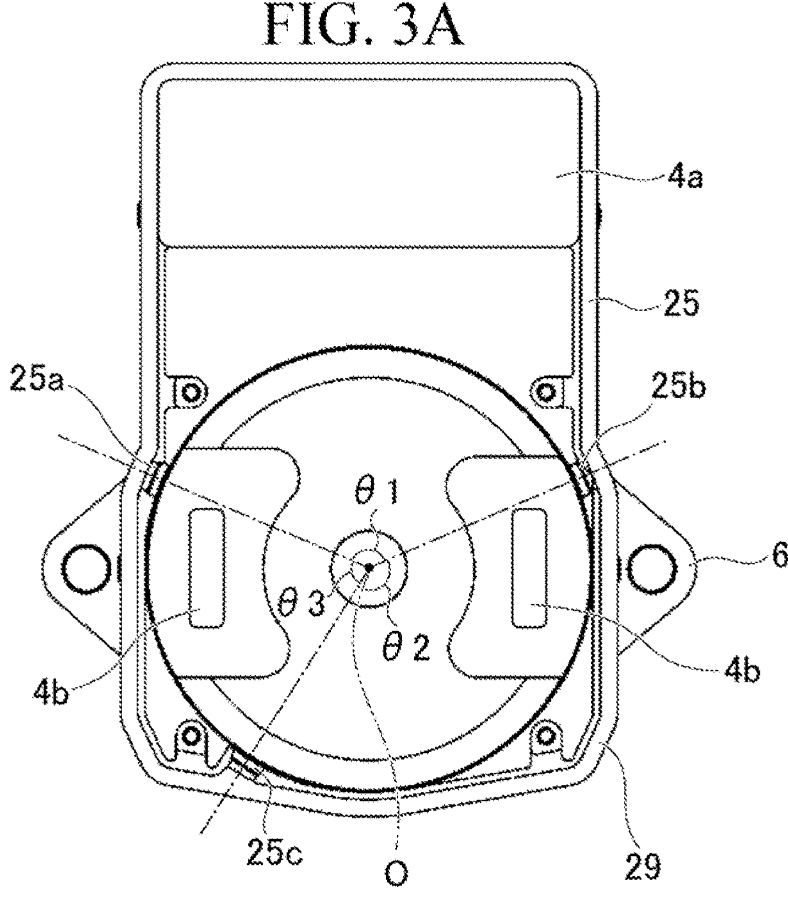
FIG. 3A shows a connection structure between a cover and the motor frame in FIG. 1.
Figure 3B:
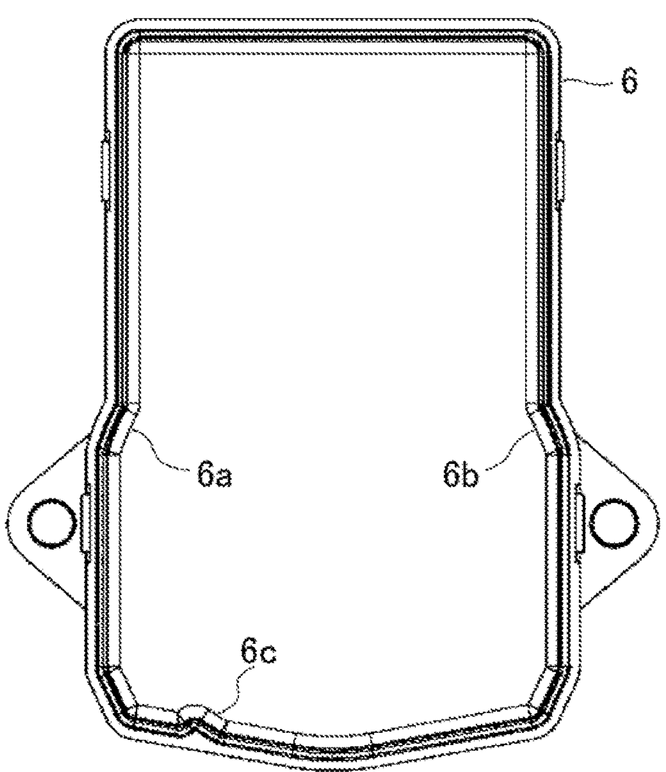
FIG. 3B is a plan view showing the shape of the cover in FIG. 3A.

FIG. 2 shows the shape of a claw portion of Embodiment 1. FIG. 3A shows a connection structure between the cover 6 and the motor frame 25 of Embodiment 1, and FIG. 3B shows the shape of the cover 6.

As shown in FIG. 2, three claw portions 25*a*, 25*b*, and 25*c* are provided on the motor frame 25. The three claw portions 25*a* to 25*c* are disposed to have the same radius centered on the rotary shaft 21 of the motor 2, and the angle between two claw portions adjacent to each other in a circumferential direction is smaller than 180 degrees. Specifically, the three claw portions 25*a* to 25*c* are provided at positions separated by the same distance from a center O of the rotary shaft 21.

Further, the board contact surfaces 25*d*1 to 25*d*6 are provided on the inner peripheral edge of the motor frame 25 in order to fix the control board 4 to the motor frame 25.

When an imaginary line (a dotted chain line in FIG. 3A) is drawn from the center O of the rotary shaft 21 to each of the claw portions 25*a* to 25*c*, each of an angle θ1 between the claw portions 25*a* and 25*b* adjacent to each other, an angle θ2 between the claw portions 25*b* and 25*c* adjacent to each other, and an angle θ3 between the claw portions 25*c* and 25*a* adjacent to each other is smaller than 180 degrees. In Embodiment 1, the angles are larger in the order of the angle θ2, the angle θ1, and the angle θ3 (angle θ2>angle θ1>angle θ3). Further, lower limits of the angles θ1 to θ3 are preferably 90 degrees or more, although it depends on the shape of the cover 6.

As shown in FIG. 3B, at least three press-fitting surfaces 6*a* to 6*c* are provided on an inner surface of the cover 6. Each of the three claw portions 25*a* to 25*c* are press-fitted to and come into contact with each of the three press-fitting surfaces 6*a* to 6*c*.

The press-fitting surface 6*a* is provided on the inner surface of the cover 6 corresponding to the claw portion 25*a*, the press-fitting surface 6*b* is provided on the inner surface of the cover 6 corresponding to the claw portion 25*b*, and the press-fitting surface 6*c* is provided on the inner surface of the cover 6 corresponding to the claw portion 25*c*.

Further, an electrically-conductive surface treatment is applied to an inner surface of the cover 6 which includes the press-fitting surfaces 6*a* to 6*c*. A surface treatment using electrodeposition coating of resin is applied to a surface of the cover 6 which includes an outer surface outside the inner surface.

In the control board 4, in order to shorten the connection distance between the connector 5*a*, 5*b* and the motor terminal 28*a*, it is necessary to connect the end portion 4*a* of the control board 4 to the connector 5*a*, 5*b*, connect a side portion 4*b* of the control board 4 to the motor terminal 28*a*, mount the power circuit on the back surface of the motor 2, and mount the control circuit between the power circuit and the connector 5*a*, 5*b*.

Further, in order to reduce costs and improve a yield, the control board 4 has a polygonal shape that includes the circular shape of the motor 2. Therefore, it is preferable that the claw portions 25*a* to 25*c* of the motor frame 25 are disposed at locations close to the control board 4 on the circumference of the motor 2. However, in a case where the claw portions are disposed below the motor 2, the height of the motor 2 in the direction along the rotary shaft 21 increases, so that there is a possibility that mountability may deteriorate. Therefore, it is preferable to dispose the claw portion at a position that does not affect the height of the motor 2. Specifically, it is preferable to form the claw portions 25*a* to 25*c* in the vicinity of a sealing surface 29 for sealing between the cover 6 and the motor frame 25. In Embodiment 1, the sealing surface 29 is provided at the outer edge of the motor frame 25, and the claw portions 25*a* to 25*c* are provided in the motor frame 25 and disposed inside the sealing surface 29. In the sealing surface 29, a silicone-based adhesive is applied to the gap between the cover 6 and the motor frame 25 in order to prevent water from entering between the cover 6 and the motor frame 25.

Each of the three press-fitting surfaces 6*a* to 6*c* has a curved surface shape concave toward the outside of the cover 6. Further, each of the three claw portions 25*a* to 25*c* has a curved surface shape concave toward the outside of the motor frame 25. The contact surface between the press-fitting surface 6*a* and the claw portion 25*a*, the contact surface between the press-fitting surface 6*b* and the claw portion 25*b*, and the contact surface between the press-fitting surface 6*c* and the claw portion 25*c* are formed such that a normal line (the dotted chain lines in FIG. 3A) to each contact surface passes through the center O of the rotary shaft 21.

Further, the radius of curvature of each of the press-fitting surfaces 6*a* to 6*c* is larger than the radius of curvature of each of the claw portions 25*a* to 25*c*.

Figure 4:
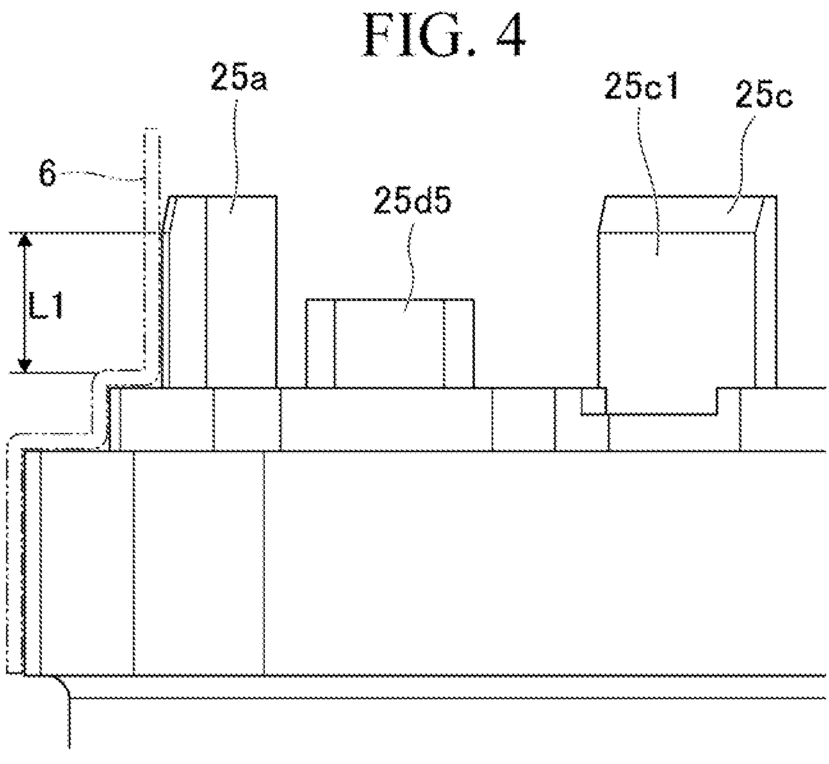
FIG. 4 is a side view showing a claw portion and a board contact surface in FIG. 1.

Press-fitting surfaces of the claw portions 25*a* to 25*c* of the motor frame 25 are set higher than the board contact surfaces 25*d*1 to 25*d*6. Specifically, as shown in FIG. 4, the height of the press-fitting surface 25*c*1 of the claw portion 25*c* of the motor frame is set higher than the height of the board contact surface 25*d*5.

In Embodiment 1, the control board 4 on which the power circuit having the switching element 31 is mounted, the motor 2 which is driven by the control board 4, the motor frame 25 which accommodates the motor 2, the cover 6 which covers the control board 4 together with the motor frame 25, and the heat sink 27 which is fixed to the motor frame 25 are included. At least three claw portions 25*a* to 25*c* are provided on the motor frame 25, the cover 6, and the heat sink 27 are made of metal, the motor frame 25, at least three press-fitting surfaces 6*a* to 6*c*, each of which the three claw portions 25*a* to 25*c* are each press-fitted to and come into contact with, are provided on an inner surface of the cover 6, the three claw portions 25*a* to 25*c* are disposed to have the same radius centered on the rotary shaft 21 of the motor 2, and the angle between two claw portions adjacent to each other in the circumferential direction is smaller than 180 degrees.

With this configuration, each of the claw portions 25*a* to 25*c* of the motor frame made of metal comes into contact with each of the press-fitting surfaces 6*a* to 6*c* of the cover 6 made of metal, and all the angles θ1, θ2, and θ3 are smaller than 180 degrees. In this way, since the cover 6 holds the motor frame 25 in a well-balanced manner, the contact pressure between the cover 6 and the motor frame 25 is stabilized. Therefore, the motor frame 25 and the cover 6 have stable electrical contact points, so that it becomes possible to improve the EMC performance and stabilize the EMC performance.

The sealing surface 29 for sealing between the cover 6 and the motor frame 25 is provided at the outer edge of the motor frame 25, and the claw portions 25*a* to 25*c* are provided in the motor frame 25 and are disposed inside the sealing surface 29.

The cover 6 is usually subjected to surface treatment to have insulating properties. At this time, the press-fitting surfaces 6*a* to 6*d* of the cover 6 are provided inside the sealing surface 29 of the motor frame 25. Therefore, in the inner surface of the cover 6, only the contact surfaces between the claw portions 25*a* to 25*c* and the press-fitting surfaces 6*a* to 6*c* may not be subjected to the surface treatment, so that it is possible to secure the electrical contact between the motor frame 25 and the cover 6 while securing the corrosion resistance of the cover.

In Embodiment 1, there are three claw portions and three press-fitting surfaces. However, there is no limitation thereto, and the number of claw portions and the number of press-fitting surfaces may be four or more.

The angles are set to be larger in the order of the angle θ2, the angle θ1, and the angle θ3. However, the angle θ1, the angle θ2, and the angle θ3 may be the same angle. That is, each of the angle θ1, the angle θ2, and the angle θ3 may be 120 degrees.

Further, in Embodiment 1, the claw portions 25*a* to 25*c* are disposed inside the sealing surface 29. However, the positions of the claw portions 25*a* to 25*c* are not limited thereto.

Since each of the three contact surfaces where the three press-fitting surfaces 6*a* to 6*c* comes into contact with each of the claw portions 25*a* to 25*c*, are formed such that the normal line (the dotted chain line in FIG. 3A) to each contact surface passes through the center O of the rotary shaft 21, the contact pressure between the cover 6 and the motor frame 25 becomes more stable. However, the normal line to the contact surface does not need to necessarily pass through the center O of the rotary shaft 21. For example, the press-fitting surfaces 6*a* to 6*c* may face the direction in which the rotary shaft 21 extends.

Further, in a case where the radius of curvature of each of the press-fitting surfaces 6*a* to 6*c* is the same as the radius of curvature of each of the claw portions 25*a* to 25*c*, due to variation in the machining of the press-fitting surfaces 6*a* to 6*c* and the claw portions 25*a* to 25*c*, there is a possibility that the claw portions 25*a* to 25*c* come into contact with the press-fitting surfaces 6*a* to 6*c*, for example, at two locations on each of the outer surfaces of the claw portions 25*a* to 25*c*. On the other hand, in Embodiment 1, since the radius of curvature of each of the press-fitting surfaces 6*a* to 6*c* is larger than the radius of curvature of each of the claw portions 25*a* to 25*c*, the press-fitting surfaces 6*a* to 6*c* come into contact with the claw portions 25*a* to 25*c* in the vicinity of the center (at one location). In this way, it becomes possible to stabilize the contact pressure between the cover 6 and the motor frame 25.

Each of the press-fitting surfaces 6*a* to 6*c* of the cover 6 has a curved surface shape. However, the press-fitting surface may have a flat surface shape. In this case, the press-fitting surfaces 6*a* to 6*c* face the direction in which the rotary shaft 21 extends. The cover 6 needs to be formed by press processing, and in a case where the press-fitting surfaces 6*a* to 6*c* are curved surfaces, it is difficult to control the shape of the radius of curvature, and manufacturing errors are likely to occur. Therefore, by forming each of the press-fitting surfaces 6*a* to 6*c* of the cover 6 into a flat surface shape, only the distance between each of the press-fitting surfaces 6*a* to 6*c* and the rotary shaft 21 may be controlled, so that processing can be performed relatively easily.

Further, in the board contact surfaces 25*d*1 to 25*d*6, in order to suppress distortion when the control board 4 is fixed with the screws 55, there is a case where the board contact surfaces 25*d*1 to 25*d*6 are cut to the same height after casting. In a case where the dimensional accuracy of the claw portions 25*a* to 25*c* of the motor frame 25 cannot be secured due to the shape of the motor frame 25 by setting the press-fitting surfaces of the claw portions 25*a* to 25*c* of the motor frame 25 to be higher than the board contact surfaces 25*d*1 to 25*d*6, it becomes possible to process the board contact surfaces 25*d*1 to 25*d*6 in the same cutting process. In this way, it becomes possible to secure a stable electrical contact point between the cover 6 and the motor frame 25 without the need to add processing equipment.

Modification Example of Embodiment 1

Figure 5:
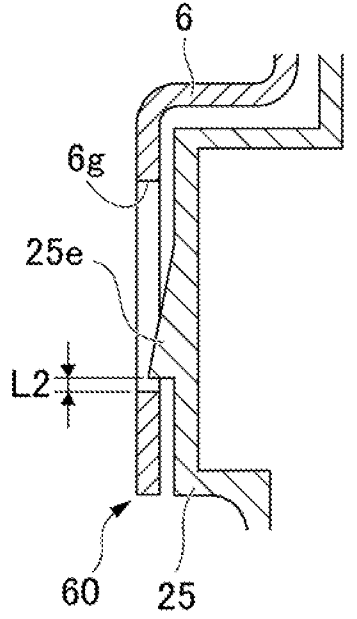
FIG. 5 is a sectional view of a main part showing a modification example of the electric motor according to Embodiment 1.

As shown in FIG. 5, in Modification Example 1, the cover 6 and the motor frame 25 are engaged with each other by snap-fit (a fitting portion) 60.

In the structure of the present disclosure, an outer claw portion 25*e* that protrudes outward is formed on an outer periphery of the motor frame 25. Further, a hole portion 6*g* is provided in an outer periphery of the cover 6. When viewed from the direction of the center O of the rotary shaft 21, the hole portion 6*g* is provided on an outer peripheral surface at a different position from the press-fitting surfaces 6*a* to 6*c*. The outer claw portion 25*e* is engaged with the hole portion 6*g*, so that the outer periphery of the cover 6 and the outer periphery of the motor frame 25 are connected to each other by snap-fit.

In a case where an external force is applied from the side of the cover 6, there is a possibility that the cover 6 may rotate around the rotary shaft 21. In particular, in a case where an iron material with good press workability is used for the cover 6, there is a problem in that the holding force of the cover 6 decreases at a low temperature due to a difference in coefficient of linear expansion (iron material: $1.1\times10^{-5}$/T, aluminum material: $2.1\times10^{-5}$/T) between the iron material of the cover 6 and the aluminum material of the motor frame 25. By adding the snap-fit 60 to the outer peripheral surface of the cover 6 as a countermeasure against this problem, even in a case where an external force is applied from the side of the cover 6, the cover 6 does not come off from the motor frame 25 and is held by the motor frame 25.

Further, as shown in FIG. 5, the dimension of a gap of the outer claw portion 25*e* of the snap-fit 60 in the direction of the center O of the rotary shaft 21 is defined as L2. This dimension L2 is set to be equal to or smaller than a length dimension L1 at which each of the press-fitting surfaces 6*a* to 6*c* of the cover 6 and each of the claw portions 25*a* to 25*c* come into contact with each other, as shown in FIG. 4. In this way, it becomes possible to secure an electrical contact point between the cover 6 and the motor frame 25 even if an external force is applied to the cover 6.

As described above, in the structure of the present disclosure, it becomes possible to secure a stable electrical contact point between the cover 6 and the motor frame 25, and to improve the EMC performance and stabilize the EMC performance.

Embodiment 2

Next, Embodiment 2 of the present disclosure will be described. However, a basic configuration is the same as that of Embodiment 1. Therefore, the same configurations will be denoted by the same reference numerals, the description thereof will be omitted, and only the different points will be described.

Embodiment 2 is different from Embodiment 1 in that claw portions 27*a* to 27*c* are formed in the heat sink 27, instead of the claw portions 25*a* to 25*c* of the motor frame 25.

Also in Embodiment 2, as with Embodiment 1, the motor frame 25 and the heat sink 27 are made of metal, and an aluminum material such as an ADC is used as the material for the motor frame 25 and the heat sink 27.

Figure 6A:
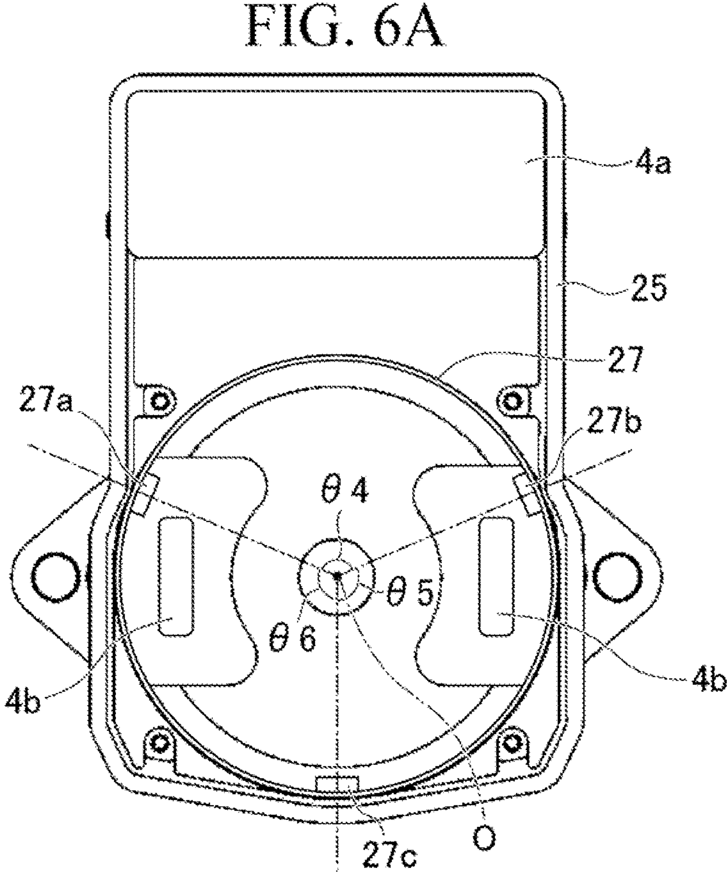
FIG. 6A shows a connection structure between a cover and a motor frame of an electric motor according to Embodiment 2.

As shown in FIG. 6A, three claw portions 27*a*, 27*b*, and 27*c* are provided on the heat sink 27. The three claw portions 27*a* to 27*c* are disposed to have the same radius centered on the rotary shaft 21 of the motor 2, and the angle between two claw portions adjacent to each other in the circumferential direction is smaller than 180 degrees. Specifically, the three claw portions 27*a* to 27*c* are provided at positions separated by the same distance from the center O of the rotary shaft 21.

The heat sink 27 is press-fitted and fixed to the inner side of the motor frame 25. With this configuration, an electrical contact point between the heat sink 27 and the motor frame 25 is secured.

When an imaginary line (a dotted chain line in FIG. 6A) is drawn from the center O of the rotary shaft 21 to each of the claw portions 27*a* to 27*c*, each of an angle θ4 between the claw portions 27*a* and 27*b* adjacent to each other, an angle θ5 between the claw portions 27*b* and 27*c* adjacent to each other, and an angle θ6 between the claw portions 27*c* and 27*a* adjacent to each other is smaller than 180 degrees. In Embodiment 2, the angle θ4, the angle θ5, and the angle θ6 are the same, which is 120 degrees.

Figure 6B:
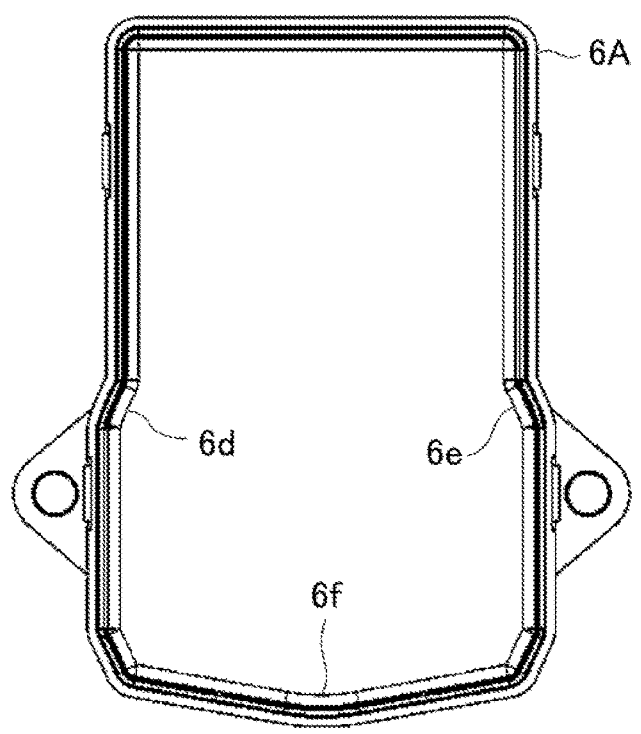
FIG. 6B is a plan view showing the shape of the cover in FIG. 6A.

As shown in FIG. 6B, press-fitting surfaces 6*d*, 6*e*, and 6*f*, each of which the claw portions 27*a* to 27*c* are each press-fitted to and come into contact with, are provided on the inner surface of a cover 6A. The press-fitting surface 6*d* is provided on the inner surface of the cover 6A corresponding to the claw portion 27*a*, the press-fitting surface 6*e* is provided on the inner surface of the cover 6A corresponding to the claw portion 27*b*, and the press-fitting surface 6*f* is provided on the inner surface of the cover 6A corresponding to the claw portion 27*c*.

Each of the three press-fitting surfaces 6*d* to 6*f* has a curved surface shape concave toward the outside of the cover 6A, as with Embodiment 1. Further, each of the three claw portions 27*a* to 27*c* has a curved surface shape concave toward the outside of the heat sink 27. The contact surface between the press-fitting surface 6*d* and the claw portion 27*a*, the contact surface between the press-fitting surface 6*e* and the claw portion 27*b*, and the contact surface between the press-fitting surface 6*f* and the claw portion 27*c* are formed such that the normal line (the dotted chain line in FIG. 6A) to each contact surface passes through the center O of the rotary shaft 21.

Further, the radius of curvature of each of the press-fitting surfaces 6*d* to 6*f* is larger than the radius of curvature of each of the claw portions 27*a* to 27*c*.

In Embodiment 2, the heat sink 27 is press-fitted and fixed to the inside of the motor frame 25, the claw portions 27*a* to 27*c* are provided in the heat sink 27, and each of the claw portions 27*a* to 27*c* of the heat sink 27 made of metal is in contact with each of the press-fitting surfaces 6*d* to 6*f* of the cover 6A made of metal.

With this configuration, by providing the claw portions 27*a* to 27*c* in the heat sink 27, it is possible to secure a stable electrical contact point between the cover 6A and the motor frame 25 through the heat sink 27, even if the claw portions 27*a* to 27*c* of the heat sink 27 and the press-fitting surfaces 6*d* to 6*f* of the cover 6A are press-fitted and fixed to each other. As a result, it becomes possible to improve the EMC performance and stabilize the EMC performance.

Further, all the angles θ4, θ5, and θ6 are the same and are 120 degrees. In this way, the cover 6A holds the heat sink 27 in a well-balanced manner, so that the contact pressure between the cover 6A and the heat sink 27 is more stable.

Further, in Embodiment 2, since the claw portions 27*a* to 27*c* are provided on the heat sink 27, it becomes possible to dispose the claw portion 27*c* of the heat sink 27 below the motor 2 without changing the height of the motor 2 in the direction along the rotary shaft 21 of the motor 2. As a result, it becomes possible to stabilize the holding force of the cover 6A without decreasing the mountability.

In Embodiment 2, the angles θ4, θ5, and θ6 are the same, which is 120 degrees. However, the angle is not limited to this, and it is acceptable if the angle between the claw portions adjacent to each other is smaller than 180 degrees. Further, the lower limit of each of the angles θ4 to θ6 is preferably 90 degrees or more, although it depends on the shape of the cover 6A.

Further, the claw portions 27*a* to 27*c* are set to have a curved surface shape. However, the claw portions 27*a* to 27*c* may be flat surfaces.

Further, in Embodiment 1 and Embodiment 2, the inner surface including the press-fitting surfaces 6*a* to 6*c* of the cover 6 or the press-fitting surfaces 6*d* to 6*f* of the cover 6A may be subjected to an electrically-conductive surface treatment, and the surface of the cover 6 or 6A, including the outer surface outside the inner surface, may be subjected to surface treatment using electrodeposition coating of resin. In usage environment where corrosion resistance is required, a silicone-based adhesive is applied to the gap between the cover 6 or 6A and the motor frame 25 in order to prevent water from entering between the cover 6 or 6A and the motor frame 25. However, in a case of surface-treating the iron material of the cover 6 or 6A, it is necessary to perform electrically-conductive surface treatment. In a case where water enters through the gap between the cover 6 or 6A and the motor frame 25, electrolytic corrosion occurs due to the potential difference between different materials, resulting in a problem of reduced corrosion resistance. In the structure of the present disclosure, the contact surface between the cover 6 or 6A and the motor frame 25 is installed inside the surface to which the silicone-based adhesive is applied. In this way, by performing electrodeposition coating of highly corrosion-resistant resin on the outer side than the press-fitting surfaces 6*a* to 6*c* of the cover 6 or the press-fitting surfaces 6*d* to 6*f* of the cover 6A, it becomes possible to improve the corrosion resistance of the cover 6 or 6A while securing the electrical contact between the cover 6 or 6A and the motor frame 25.

Although the content of the present disclosure has been specifically described above with reference to the preferred embodiments, it will be apparent to those skilled in the art that various modification aspects can be made based on the basic technical idea and teachings of the present disclosure.

It is possible to combine each embodiment and the modification example, or to appropriately modify or omit each embodiment.

REFERENCE SIGNS LIST

2: Motor
4: Control board
6, 6A: Cover
6*a*, 6*b*, 6*c*, 6*d*, 6*e*, 6*f*: Press-fitting surface
21: Rotary shaft (output shaft)
25: Motor frame
25*a*, 25*b*, 25*c*: Claw portion of motor frame
27: Heat sink
27*a*, 27*b*, 27*c*: Claw portion of heat sink
31: Switching element
60: Snap-fit (fitting portion)

What is claimed is:

1. A rotary electric machine comprising:

a control board on which a power circuit having a switching element is mounted;

a motor which is driven by the control board;

a motor frame which accommodates the motor;

a cover which covers the control board together with the motor frame; and a heat sink which is fixed to the motor frame, wherein the motor frame, the cover, and the heat sink are made of metal, at least three claw portions are provided on the motor frame or the heat sink, at least three press-fitting surfaces are provided on an inner surface of the cover, where each of the three claw portions are press-fitted to and come into direct contact with each of the three press-fitting surfaces, and the three claw portions are disposed to have the same radius centered on an output shaft of the motor, and an angle between two claw portions adjacent to each other in a circumferential direction is smaller than 180 degrees, wherein each of the three press-fitting surfaces and each of the three claw portions have a curved surface shape, a contact surface between each of the three press-fitting surfaces and each of the three claw portions is formed such that a normal line to the contact surface passes through a center of the output shaft, and a radius of curvature of each of the press-fitting surfaces is larger than a radius of curvature of each of the claw portions.

2. The rotary electric machine according to claim 1, wherein a sealing surface for sealing between the cover and the motor frame is provided on an outer edge of the motor frame, and the claw portions are provided in the motor frame and disposed inside the sealing surface.

3. The rotary electric machine according to claim 1, wherein the heat sink is press-fitted and fixed to an inner side of the motor frame, and the claw portions are provided in the heat sink.

4. The rotary electric machine according to claim 1, wherein the cover has a hole portion on an outer peripheral surface at a position different from a position where the press-fitting surface is provided, the motor frame has an outer claw portion that fits into the hole portion, the outer claw portion being provided on the outer periphery of the motor frame, and a gap between the hole portion and the outer claw portion in a direction of the output shaft of the motor is shorter than a length at which the claw portion and the press-fitting surface come into contact with each other.

5. The rotary electric machine according to claim 1, wherein an electrically-conductive surface treatment is applied to the inner surface of the cover which includes the press-fitting surfaces, and a surface treatment using electrodeposition coating of resin is applied to a surface of the cover which includes an outer surface outside the inner surface.

6. The rotary electric machine according to claim 1, wherein the three press-fitting surfaces are flat surfaces and face the output shaft.

* * * * *